United States Patent
Schradi

(10) Patent No.: US 6,262,766 B1
(45) Date of Patent: Jul. 17, 2001

(54) METHOD FOR ASSESSING THE QUALITY OF A TELEVISION IMAGE

(75) Inventor: Stefan Schradi, Villingen-Schwenningen (DE)

(73) Assignee: XSYS Interactive Research GmbH, Villingen-Schwenningen (DE)

( * ) Notice: Subject to any disclaimer, the term of this patent is extended or adjusted under 35 U.S.C. 154(b) by 0 days.

(21) Appl. No.: 09/319,088
(22) PCT Filed: Sep. 30, 1998
(86) PCT No.: PCT/DE98/02900
§ 371 Date: Sep. 30, 1999
§ 102(e) Date: Sep. 30, 1999
(87) PCT Pub. No.: WO99/17556
PCT Pub. Date: Apr. 8, 1999

(30) Foreign Application Priority Data

Sep. 30, 1997 (DE) ................................ 197 43 125

(51) Int. Cl.⁷ ............... H04N 17/00; H04N 5/08; H04N 5/46; H04N 5/21
(52) U.S. Cl. ............ 348/194; 348/194; 348/191; 348/192; 348/525; 348/558; 348/611
(58) Field of Search .................... 348/192, 193, 348/194, 180, 1–6, 611, 614, 558, 525

(56) References Cited

U.S. PATENT DOCUMENTS

| 4,191,965 | * | 3/1980 | Nelson | 358/10 |
| 4,399,459 | * | 8/1983 | Mulvanny et al. | 358/150 |
| 5,126,990 | * | 6/1992 | Efron et al. | 369/58 |
| 5,784,121 | * | 7/1998 | Geerlings | 348/547 |
| 5,900,914 | * | 5/1999 | Niijima | 348/521 |
| 5,999,222 | * | 12/1999 | Xie | 348/525 |
| 6,008,858 | * | 12/1999 | Swan et al. | 348/523 |

* cited by examiner

Primary Examiner—Reinhard J. Eisenzopf
Assistant Examiner—Paulos Natnael
(74) Attorney, Agent, or Firm—Herbert L. Lerner; Laurence A. Greenberg; Werner H. Stemer

(57) ABSTRACT

A method assesses the quality of a television image. In diversity reception installations including several receivers, it is necessary to establish a criterion for selecting the receiver with the best image quality. For this purpose, the five vertical connection impulses are first detected in the video signal. The detection of the five equalization impulses initiates only after the vertical connection impulses have been detected. Then, the detection of the horizontal synchronization impulses, interfering impulses and the echo impulses is carried out only after the equalization impulses have been detected. The number of horizontal synchronization impulses, interfering impulses, and echo impulses detected is used as criterion for selecting the best receiver. The invention is applicable to diversity reception installations including several television receivers, in particular, for mobile installations.

10 Claims, 3 Drawing Sheets

METHOD FOR ASSESSING THE QUALITY OF A TELEVISION IMAGE

BACKGROUND OF THE INVENTION

Field of the Invention

The invention relates to a method for evaluating the quality of a television picture.

Reception poses no appreciable difficulty in stationary television receiving stations because the reception conditions are largely constant. By contrast, the reception conditions in mobile receiving stations can fluctuate considerably depending on the nature of the terrain being traveled through, because momentary interference pulses and echo pulses can occur. In the meantime, motor vehicles, such as e.g. passenger cars and touring coaches, but also railroad vehicles are being equipped with television receivers and screens in order to be able, on the one hand, to display messages, for example traffic messages communicated via teletext, or, on the other hand, to entertain travelers with television programs. The reception conditions in a moving receiving station fluctuate considerably, under certain circumstances, owing to the terrain currently being traveled through; these reception conditions mean that great strain is put on traveling television viewers' eyes, in an unpleasant manner, because the picture quality can fluctuate to a considerable extent. If the vehicle travels through a radio shadow, for example, all the viewer sees on the screen is noise. Viewing a television program subjected to such interference is more likely to lead to the viewers becoming tired than serve to entertain them.

It is known to improve the reception of radio signals in mobile receiving stations by means of multipath reception, referred to as "diversity". Space diversity is understood to mean a system having a plurality of receivers which receive identical signals, e.g. the same television program, at identical frequencies. Frequency diversity is understood to mean a system likewise comprising a plurality of receivers, which receive identical signals, e.g. the same television program, at different frequencies. In a diversity system, the receiver which has the best reception in each case is selected according to some criterion. For a diversity reception system having a plurality of receivers, therefore, it is necessary to provide a criterion for selection of the receiver which has the best reception.

SUMMARY OF THE INVENTION

The object of the invention, therefore, is to specify a method for evaluating the picture quality of a television picture.

The invention achieves this object by:

the five vertical serration pulses are detected;

only when the five vertical serration pulses have been detected is the detection of the five equalizing pulses begun;

only when the subsequent five equalizing pulses have also been detected after the five vertical serration pulses are the horizontal sync pulses, echo pulses and interference pulses detected;

the number of detected horizontal sync pulses, interference pulses and echo pulses serves as a criterion for the picture quality.

The figures show flow diagrams using which the invention is explained by way of example.

In the figures

DESCRIPTION OF THE PREFERRED EMBODIMENTS

The method according to the invention is divided into three partial steps, which are represented in the flow diagrams.

The five vertical serration pulses are detected in the first step. Only when these five vertical serration pulses have been detected is the detection of the subsequent five equalizing pulses begun in the second step. Only when five equalizing pulses have been detected in the second step subsequent to the five vertical serration pulses detected in the first step is the actual detection of the horizontal pulses, interference pulses and echo pulses begun in the third step, otherwise further attempts are made to detect vertical serration pulses.

Figure 1:
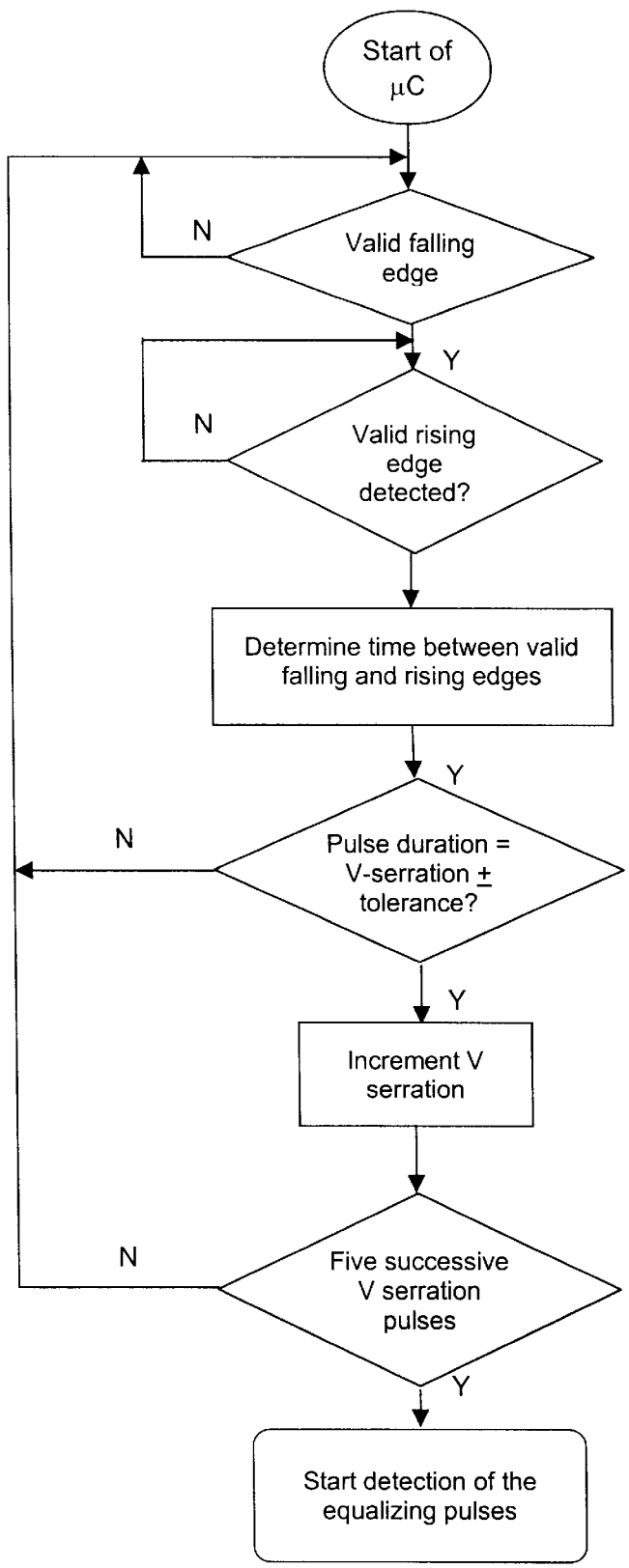
FIG. 1 shows a flow diagram for the detection of the five vertical serration pulses.

The way in which the five vertical serration pulses are detected will now be explained using an exemplary embodiment of the invention and with reference to the flow diagram shown in FIG. 1.

A counter is started with the first edge of a pulse and is reset with the second edge. A check is made to see whether the counter reaches a predetermined counter reading, which corresponds to the pulse length of a vertical serration pulse, five times in succession in the time which corresponds to the pulse train of the five vertical serration pulses. If this is the case, then a pulse train of five vertical serration pulses has been detected, otherwise the pulse duration continues to be checked in respect of the duration of a vertical serration pulse.

Figure 2:
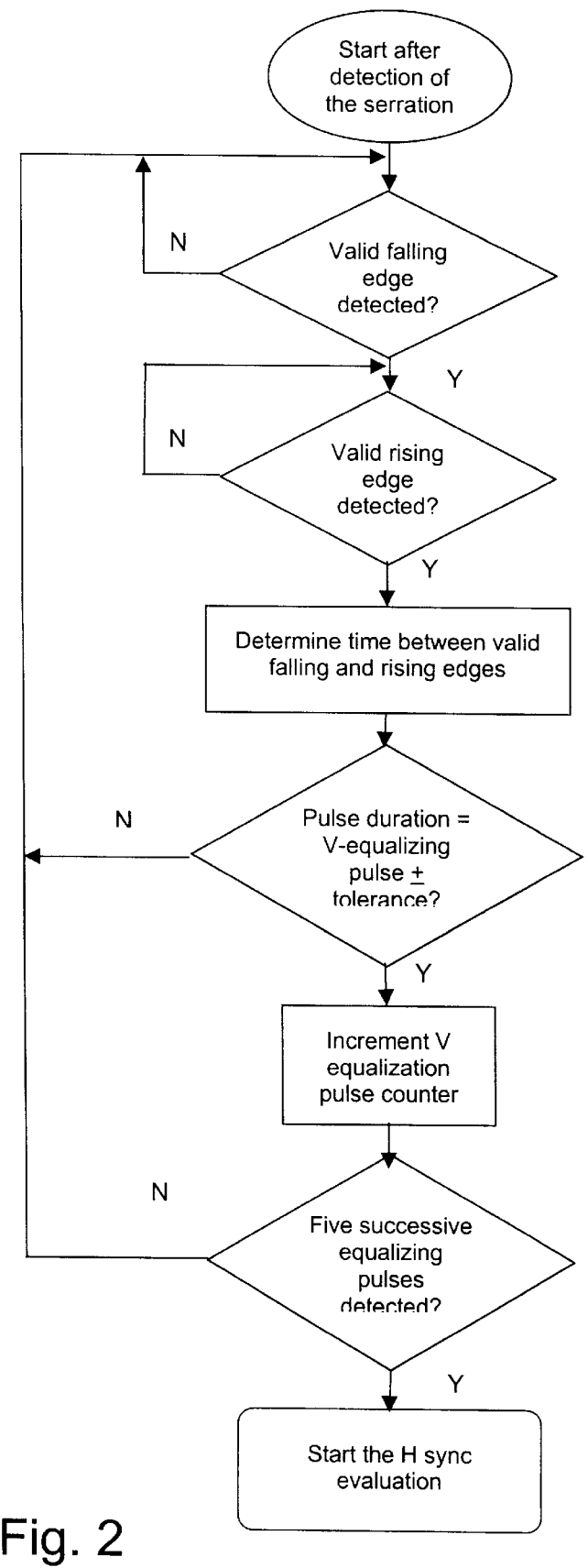
FIG. 2 shows a flow diagram for the detection of the five equalizing pulses.

The subsequent detection of the five equalizing pulses is effected in the same way as the detection of the five vertical serration pulses. It is represented in the flow diagram illustrated in FIG. 2.

A counter, preferably the same counter as used during the detection of the vertical serration pulses, is started with the first edge of a pulse and is reset with the second edge. A check is made to see whether the counter reaches a predetermined counter reading, which corresponds to the pulse length of an equalizing pulse, five times in succession in the time which corresponds to the pulse train of the five equalizing pulses. If this is the case, then a pulse train of five equalizing pulses has been detected, otherwise the pulse duration continues to be checked in respect of the duration of a vertical serration pulse.

Figure 3:
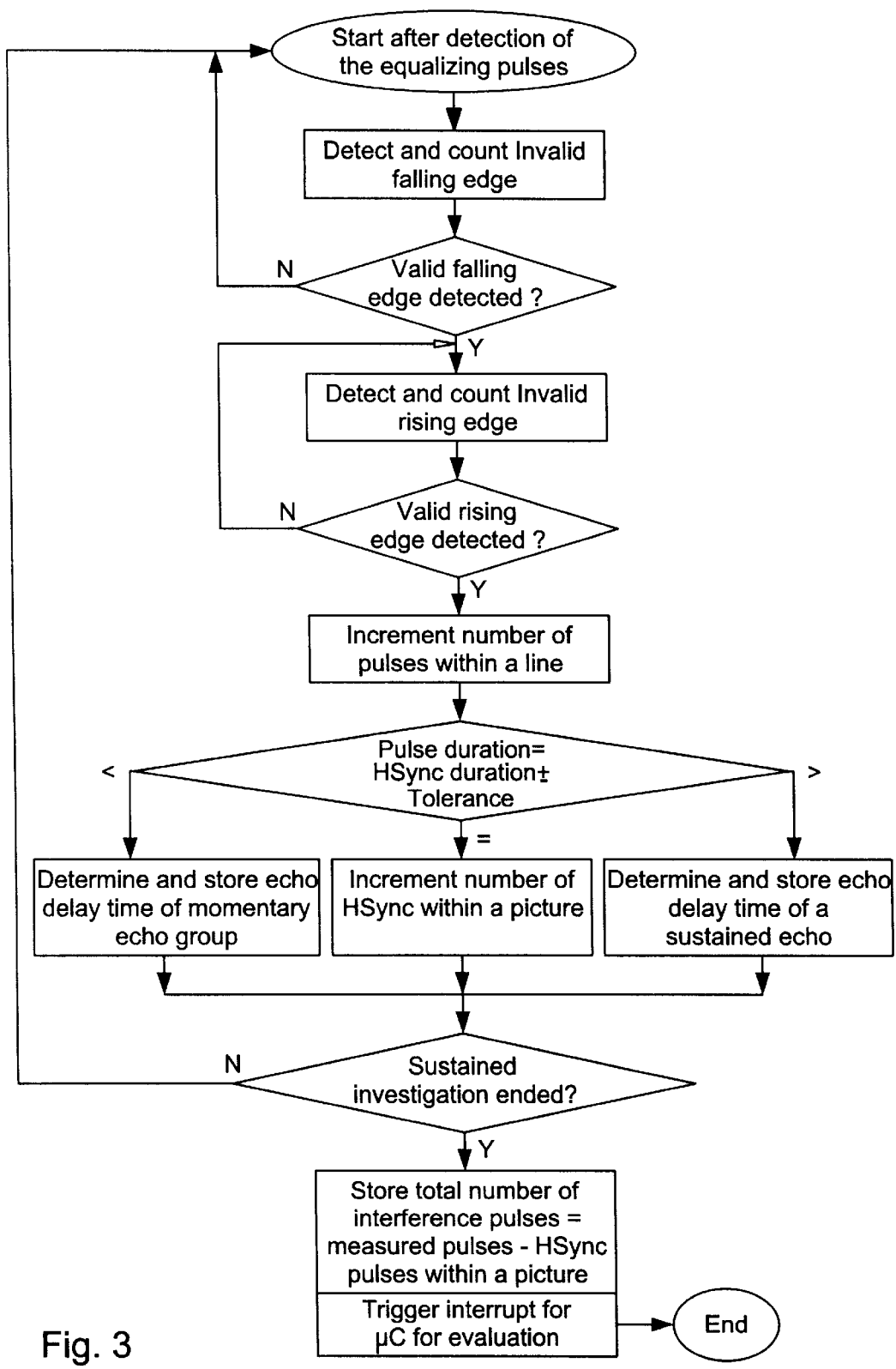
FIG. 3 shows a flow diagram for the detection of the horizontal sync pulses, and for the evaluation of the quality of a television picture.

The way in which the horizontal sync pulses, interference pulses and echo pulses are detected and a criterion for evaluating the picture quality is generated will now be explained by way of example with reference to the flow diagram illustrated in FIG. 3.

A measured pulse duration is compared with the pulse duration of a horizontal sync pulse. If a measured pulse duration corresponds to the duration of a horizontal sync pulse, then this pulse is interpreted as a horizontal sync pulse. If, on the other hand, the measured pulse duration is shorter than the duration of a horizontal sync pulse, then the pulse is interpreted as a momentary echo pulse, while it is interpreted as a sustained echo pulse if the measured pulse duration is longer than the duration of a horizontal sync pulse. If no horizontal sync pulses are detected, a check is again made in respect of the duration of a vertical serration pulse.

It is particularly advantageous to distinguish between valid and invalid edges during the detection of the vertical serration pulses, of the equalizing pulses and of the horizontal sync pulses. An edge which is followed by a further edge within a predeterminable time, e.g. one microsecond, is interpreted as an invalid edge and the pulse formed by the two edges is interpreted as an interference pulse. By virtue of this measure, brief interference pulses are detected, on the one hand, while unclean pulses with bounce are not interpreted as vertical serration, equalizing or horizontal sync pulses, on the other hand.

It is advantageous, moreover, to provide a tolerance interval for the respective pulse duration to be measured.

The number of detected interference pulses, momentary and sustained echo pulses and also horizontal sync pulses is stored for a field or frame in each case and serves as a criterion for the picture quality.

In accordance with the exemplary embodiment of the invention, in a diversity reception system having a plurality of receivers, the number of detected interference pulses, momentary echo pulses and sustained echo pulses is stored. A criterion for the picture quality is derived from the stored values for each receiver, so that it is possible to change over to the receiver with the best picture quality. By way of example, it is possible to select the receiver with the smallest number of interference, momentary echo and sustained echo pulses.

A further exemplary embodiment of the invention provides for the number of interference, momentary echo and sustained echo pulses to be weighted with factors and for the numbers weighted in this way to be added to form a total dimension figure. That receiver which has the smallest total dimension figure or sum yields the best picture.

It is an essential advantage of the invention that the detection and evaluation of the vertical serration, equalizing and horizontal sync pulses take place successively in three steps, because a comparatively large number of logic cells are saved as a result of this. Thus, for example, the same counters can, for the most part, be used for each of the three steps.

In the event of poor reception conditions, it may happen that neither vertical serration pulses nor horizontal sync pulses are detected. In these cases, a further exemplary embodiment provides for the control signals of the automatic gain control, abbreviated to AGC in English, of the individual receivers of a diversity reception system to be compared with one another and for the receiver whose control signal has the smallest level to be selected. One refinement of this exemplary embodiment provides for a changeover to be made to another receiver only when the smallest level differs from the other levels by a predetermined minimum value. Otherwise a changeover to another receiver is not yet performed, in order to avoid excessively frequent and unnecessary changeover operations.

The invention can be used particularly advantageously in a diversity reception system having a plurality of receivers in order to be able to select the receiver generating the best picture in each case. However, it is also generally suitable for evaluating the quality of a television picture, irrespective of the purpose for which the evaluation of the picture quality is intended.

What is claimed is:

1. A method for evaluating a picture quality of a television picture, the method which comprises:

detecting five vertical serration pulses;

start detecting five equalizing pulses only if the five vertical serration pulses have been detected;

detecting horizontal sync pulses, echo pulses, and interference pulses only if the five equalizing pulses have been detected after detecting the five vertical serration pulses; and using a number of the detected horizontal sync pulses, echo pulses, and interference pulses as a criterion for a picture quality.

2. The method according to claim 1, which comprises:

starting a counter with a first edge of a pulse and resetting the counter with a second edge of the pulse;

predetermining a first counter reading of the counter corresponding to an equalizing pulse length, if, within a first given time period corresponding to a pulse train of the vertical serration pulses, the counter assumes, five times in succession, a given second counter reading corresponding to a vertical serration pulse length; and start detecting the horizontal sync pulses, the interference pulses, and the echo pulses if the counter subsequently assumes the first counter reading five times in succession within a second given time period corresponding to a pulse train of the five equalizing pulses.

3. The method according to claim 1, which comprises:

interpreting an edge followed by a further edge within a given time period as an invalid edge; and interpreting a pulse formed by the edge and the further edge as an interference pulse.

4. A method for evaluating a picture quality of a television picture, the method which comprises:

a) detecting vertical serration pulses by:

interpreting an edge as an invalid edge if the edge is followed by a further edge at a first given time;

measuring a pulse duration of pulses having valid edges;

interpreting the pulses as the vertical serration pulses if the pulse duration corresponds, within a given tolerance interval, to a vertical serration pulse duration; and start detecting five subsequent equalizing pulses, if five of the vertical serration pulses are detected in succession within a time period corresponding to a pulse train of five vertical serration pulses, otherwise continue checking the pulse duration with respect to the vertical serration pulse duration;

b) detecting the equalizing pulses by:

interpreting an edge as an invalid edge if the edge is followed by a further edge at a second given time;

measuring the pulse duration of pulses having valid edges;

interpreting the pulses as the equalizing pulses if the pulse duration corresponds, within a given tolerance interval, to an equalizing pulse duration; and start detecting horizontal sync pulses, momentary echo pulses, sustained echo pulses, and interference pulses if the five equalizing pulses are detected in succession within a time period corresponding to a pulse train of five equalizing pulses, otherwise continue checking the pulse duration with respect to the vertical serration pulse duration;

c) detecting the horizontal sync pulses, the interference pulses, the momentary echo pulses, and the sustained echo pulses by:
   interpreting an edge followed by a further edge at a third given time as an invalid edge and interpreting a pulse formed by the edge and the further edge as an interference pulse;
   measuring the pulse duration of pulses having valid edges;
   interpreting the pulses as the horizontal sync pulses if the pulse duration corresponds, within a given tolerance interval, to a horizontal sync pulse duration;
   interpreting the pulses as the momentary echo pulses if the pulse duration is less than the horizontal sync pulse duration minus a first given tolerance interval;
   interpreting the pulses as the sustained echo pulses if the pulse duration is greater than the horizontal sync pulse duration plus a second given tolerance interval;
   counting, during one of a field and a frame, the detected horizontal sync pulses, the detected momentary echo pulses, the detected sustained echo pulses, and the interference pulses detected after the equalizing pulses, and storing respective numbers of the detected horizontal sync pulses, the momentary echo pulses, the sustained echo pulses, and the interference pulses;
   continue checking the pulse duration with respect to the vertical serration pulse duration if no horizontal sync pulses are detected; and
   using the respective numbers of the stored detected horizontal sync pulses, of the detected momentary echo pulses, of the detected sustained echo pulses, and of the interference pulses as a criterion for a picture quality.

5. The method according to claim 4, which comprises:
providing a diversity reception system having a plurality of receivers;
storing the numbers of the detected interference pulses, of the momentary echo pulses, and of the sustained echo pulses for each of the receivers; and
using the numbers of the detected interference pulses, of the momentary echo pulses, and of the sustained echo pulses as a criterion for selecting one of the receivers having a best picture quality.

6. The method according to claim 5, which comprises:
weighting the numbers of the interference pulses, of the momentary echo pulses, and of the sustained echo pulses with factors for generating weighted numbers; and
adding the weighted numbers and forming a total value representing the criterion for the picture quality.

7. The method according to claim 6, which comprises selecting one of the receivers having a smallest total value as the receiver having the best picture quality.

8. The method according to claim 5, which comprises selecting one of the receivers having a smallest number of at least one of the interference pulses, of the momentary echo pulses, and of the sustained echo pulses as the receiver having the best picture quality.

9. The method according to claim 5, which comprises:
comparing levels of control signals of an automatic gain control of each of the plurality of receivers with one another; and
selecting one of the receivers having a smallest level of the control signals, if no horizontal sync pulses have been detected.

10. The method according to claim 9, which comprises changing over from one of the receivers to a further one of the receivers only if the smallest level of the control signals is smaller by a given minimum value than remaining ones of the levels of the control signals.

* * * * *